(12) United States Patent
Kast et al.

(10) Patent No.: US 10,885,879 B2
(45) Date of Patent: Jan. 5, 2021

(54) MEDIA RENDERING WITH ORIENTATION METADATA

(71) Applicant: GOOGLE LLC, Mountain View, CA (US)

(72) Inventors: Anton Kast, Mountain View, CA (US); Anurag Agrawal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/325,366

(22) PCT Filed: Nov. 16, 2017

(86) PCT No.: PCT/US2017/062022
§ 371 (c)(1),
(2) Date: Feb. 13, 2019

(87) PCT Pub. No.: WO2018/094052
PCT Pub. Date: May 24, 2018

(65) Prior Publication Data
US 2019/0266980 A1 Aug. 29, 2019

Related U.S. Application Data

(63) Continuation of application No. PCT/US2016/062606, filed on Nov. 17, 2016.

(51) Int. Cl.
*G09G 5/36* (2006.01)
*G06T 11/00* (2006.01)
(Continued)

(52) U.S. Cl.
CPC ............... *G09G 5/363* (2013.01); *G06F 3/14* (2013.01); *G06T 3/00* (2013.01); *G06T 11/00* (2013.01);
(Continued)

(58) Field of Classification Search
None
See application file for complete search history.

(56) References Cited

U.S. PATENT DOCUMENTS

2009/0295787 A1 12/2009 Yao et al.
2010/0110210 A1 5/2010 Prentice
(Continued)

OTHER PUBLICATIONS

International Search Report and Written Opinion of the International Searching Authority for PCT App. No. PCT/US2016/082606 dated Jul. 21, 2017, 14 pages.
(Continued)

*Primary Examiner* — Edward Martello
(74) *Attorney, Agent, or Firm* — Foley & Lardner LLP

(57) ABSTRACT

Systems and methods for cropping media for a particular orientation using a computing device are described. In some implementations, a method may first comprise receiving by a video preprocessor of the device, a first frame of media in a first orientation. A first region comprising a first feature within the first frame may be identified, by an image analyzer. A cropping calculator of the device may generate a score for the first region based on a characteristic of the first feature and determine that the score for the first region exceeds a threshold. An image processor of the device may then crop the first frame of the video, responsive to the determination that the score for the first region exceeds the threshold, to include the first region within a predetermined display area comprising a subset of the first frame in a second orientation.

18 Claims, 7 Drawing Sheets

(51) Int. Cl.
*G06T 3/00* (2006.01)
*G06F 3/14* (2006.01)

(52) U.S. Cl.
CPC .... *G06T 2210/22* (2013.01); *G09G 2340/045* (2013.01); *G09G 2340/0442* (2013.01); *G09G 2340/0492* (2013.01); *G09G 2340/14* (2013.01)

(56) References Cited

U.S. PATENT DOCUMENTS

| | | | |
|---|---|---|---|
| 2010/0138775 A1* | 6/2010 | Kohen | G06F 9/543 715/781 |
| 2011/0085078 A1 | 4/2011 | Sie et al. | |
| 2011/0096228 A1* | 4/2011 | Deigmoeller | G06K 9/00624 348/441 |
| 2013/0069980 A1 | 3/2013 | Hartshorne et al. | |
| 2017/0249719 A1* | 8/2017 | Kansara | G06T 3/0012 |

OTHER PUBLICATIONS

International Search Report and Written Opinion of the International Searching Authority for PCT App. No. PCT/US2017/062022 dated Mar. 1, 2018, 17 pages.
PCT International Prelim. Report on Patentability dated May 31, 2019 in International Application No. PCT/US2016/062606.
PCT International Prelim. Report on Patentability dated May 31, 2019 in International Application No. PCT/US2017/062022.
Examination Report on EP 16810147.5 dated Oct. 20, 2020.

* cited by examiner

MEDIA RENDERING WITH ORIENTATION METADATA

RELATED APPLICATIONS

This application is a National Stage Application under 35 U.S.C. § 371 of International Patent Application No. PCT/US2017/062022, filed Nov. 16, 2017, which claims the benefit of and priority to P.C.T Application No. PCT/US2016/062606, entitled "Media Rendering with Orientation Metadata," filed Nov. 17, 2016, the entirety of each is incorporated by reference herein.

BACKGROUND

In a networked environment, such as the Internet or other networks, first-party content providers can provide information for public presentation on resources, such as webpages, documents, applications, and/or other resources. The first-party content may include text, video, and/or audio information provided by the first-party content providers via a resource server for presentation on a client device over the Internet. Videos and similar media recorded in a wide aspect ratio that may be designed to be viewed on a desktop or in a landscape orientation, cannot directly fit full screen onto a mobile device held in vertical or portrait orientation, and typically are either cropped to the center, losing detail at the left and right edges of the video, or are surrounded with black bars at the top and bottom, reducing the display size of the video. Vertical orientation media is a popular format for viewing and displaying media in many applications. Since many videos and other media are recorded only in a wide aspect ratio layout, there is a large amount of inventory for this layout while demand for publishers is increasingly needed for portrait layouts.

SUMMARY

One implementation relates to a method, comprising: receiving, by a mobile device, a first frame of a video in a first orientation; receiving, by the mobile device, metadata associated with the first frame of the video; extracting, by a video preprocessor of the mobile device from the metadata, an identification of a first region of the first frame of the video; cropping, by the video preprocessor of the mobile device, the first frame of the video to a cropped size centered on the identified first region of the first frame of the video, the cropped size based on a first aspect ratio, a resolution, and a second orientation to display the first frame of the video; and displaying, on a display of the mobile device, the cropped first frame of the video in the second orientation.

Cropping the first frame of the video may further comprise: calculating frame boundaries to apply to the first frame of the video based on the first aspect ratio, the resolution, and the second orientation; and identifying cropping coordinates for a rectangle centered on the identified first region of the first frame of the video based on the calculated frame boundaries.

Cropping the first frame of video may further comprise identifying cropping coordinates for a rectangle bounding all of the first region.

The region may be associated with a plurality of regions of the first frame of the video, and cropping the first frame of the video may further comprise: calculating frame boundaries to apply to the first frame of the video based on the first aspect ratio, the resolution, and the second orientation; and identifying cropping coordinates for a rectangle centered on one of the plurality of regions of the first frame of the video based on the calculated frame boundaries.

The method may further comprise: determining the cropping coordinates for the rectangle are insufficient to bound all of the plurality of regions; and wherein identifying the cropping coordinates for the rectangle centered on one of the plurality of regions may comprise including a text image within the cropping coordinates for the rectangle.

The method may further comprise: receiving, by the mobile device, a second frame of the video in the first orientation; extracting, by the video preprocessor of the mobile device, region data associated with a second region of the second frame of the video from the metadata; cropping, by the video preprocessor of the mobile device, the second frame of the video to the cropped size centered on the identified first region of the first frame and further based on the first aspect ratio, the resolution, and the first orientation to display the second frame of the video; and displaying, on the display of the mobile device, the cropped second frame of the video in the first orientation. The method may further comprise receiving an indication of a change in orientation from the second orientation to the first orientation.

The metadata may comprise one or more regions of the first frame of the video with associated scores. The or each score may be associated with at least one feature of the respective region. The or each score may be a score generated based upon one or more characteristics of the at least one feature. The one or more regions of the first frame of the video may be associated with scores that exceed a predetermined threshold value.

The region identified by the metadata may be generated by receiving by a video preprocessor of a device, a first frame of media (e.g. a video) in a first orientation. A first region comprising a first feature within the first frame may be identified, by an image analyzer. A cropping calculator of the device may generate a score for the first region based on a characteristic of the first feature and determine that the score for the first region exceeds a threshold. Another implementation relates to a system for cropping media for a particular orientation using a computing device. The system may comprise one or more of one or more processors of a device, a network interface electrically connected to the one or more processors, and a computer storage device electrically connected to the one or more processors storing instructions. The instructions, when executed by the one or more processors, may cause the one or more processors to perform operations comprising the above method.

Yet a further implementation relates to a computer readable storage device storing instructions that, when executed by one or more processors, cause the one or more processors to perform several operations. The operations may include operations comprising the above method.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Various implementations and applications are provided primarily for illustrative purposes.

Implementations disclosed herein relate to systems and methods for automatically converting a video in landscape mode to fit in portrait mode, or vice versa, while remaining in full screen that provides an improved cropped video compared to center cropping or adding padding to the top/bottom. The video may, in some implementations, be modified such that display on a device is improved, and may, in some implementations, be adapted for the device. Conversion can include detection of parts of the image or video (e.g., features) for each frame that are important. Based on the identified important areas, the image or video may be intelligently cropped or padded to retain important features while discarding unimportant regions, static borders, etc. Features detected may include face tracking, object detection and/or recognition, text detection, detection of dominant colors, motion analysis, scene change detection, and image saliency. Detection and recognition can use methods and algorithms that are deep learning based. Text detection may use optical character recognition (OCR). Detection of features allows for an optimal cropping path. Other aspects may include padding the image to match the background color and removing and/or reformatting any borders to fit the new display mode. Although primarily discussed in terms of video, in many implementations the systems may be applied to individual images or frames.

Figure 1:
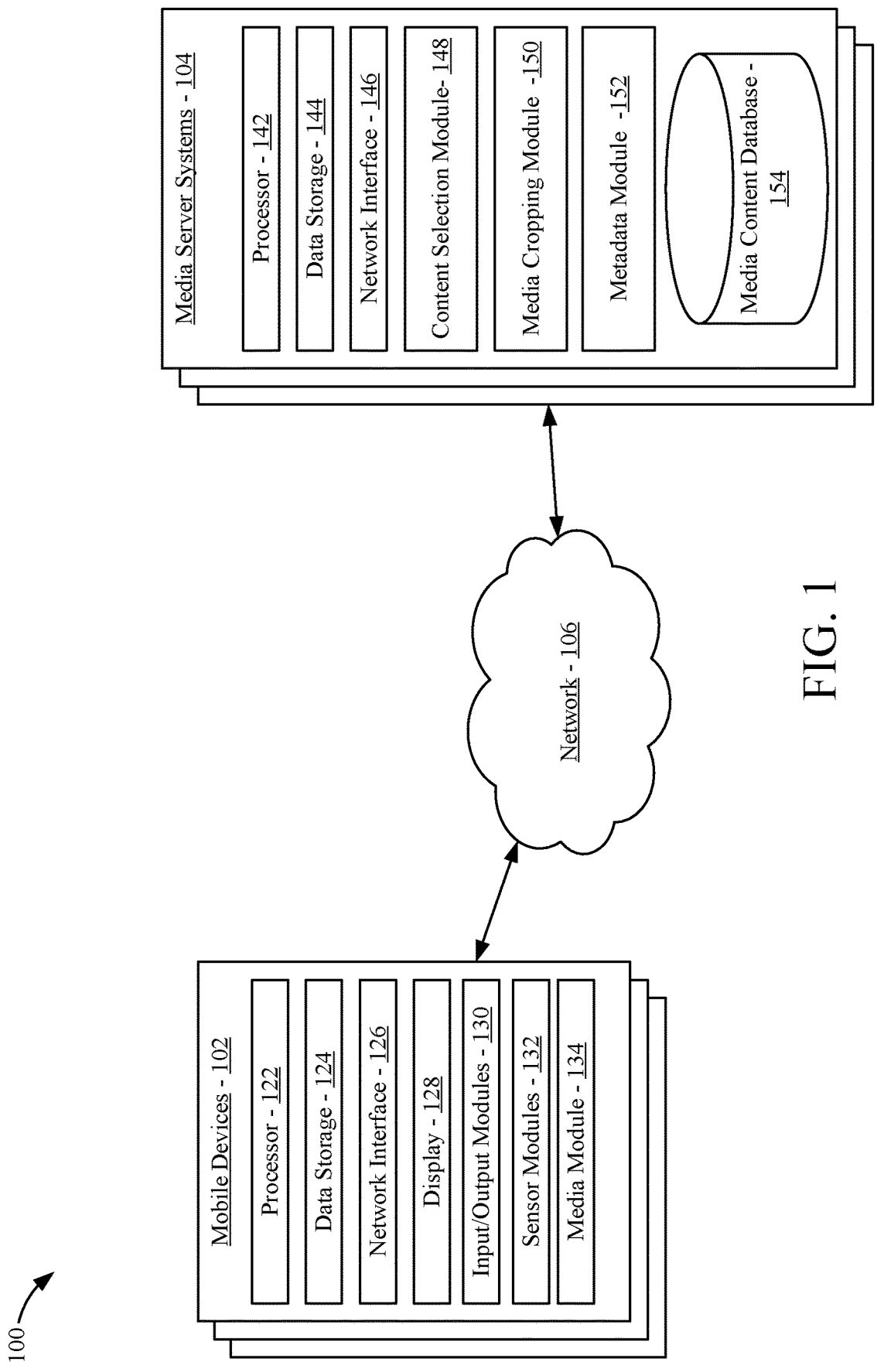
FIG. 1 is a block diagram depicting an implementation of an environment for automatic conversion of media from one orientation to another.

FIG. 1 is a block diagram of an implementation of an environment 100 for automatic conversion of video from one orientation to another over a network 106. The network 106 may include a local area network (LAN), wide area network (WAN), a telephone network, such as the Public Switched Telephone Network (PSTN), a wireless link, an intranet, the Internet, or combinations thereof. The environment 100 also includes mobile devices 102. In some implementations, mobile devices 102 include a processor 122, data storage 124, a network interface 126, a display 128, input/output modules 130, sensor modules 132, and media modules 134. Sensor module 132 may be configured to contain sensors to detect orientation of computing devices (e.g., an accelerometer and/or magnetometer) and other similar sensors contained in many mobile devices. The processor 122 may include a microprocessor, an application-specific integrated circuit (ASIC), a field-programmable gate array (FPGA), etc., or combinations thereof. The data storage 124 may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor 122 can read instructions. The instructions may include code from any suitable computer programming language such as, but not limited to, C, C++, C#, Java®, JavaScript®, Perl®, HTML, XML, Python®, and Visual Basic®.

The mobile device 102 can include one or more devices such as a computer, laptop, smart phone, tablet, personal digital assistant configured to communicate with other devices via the network 106. The device may be any form of portable electronic device that includes a data processor and a memory. The data storage 124 may store machine instructions that, when executed by a processor, cause the processor to perform one or more of the operations described herein. The data storage 124 may also store data to effect presentation of one or more resources, content items, etc. on the computing device. The processor may include a microprocessor, an application-specific integrated circuit (ASIC), a field-programmable gate array (FPGA), etc., or combinations thereof. The data storage 124 may include, but is not limited to, electronic, optical, magnetic, or any other storage or transmission device capable of providing processor with program instructions. The data storage 124 may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The mobile device 102 can execute a software application (e.g., a web browser or other application) to retrieve content from other computing devices over network 106. Such an application may be configured to retrieve first-party content from a media server system 104. In some cases, an application running on the mobile device 102 may itself be first-party content (e.g., a game, a media player, etc.). In one implementation, the mobile device 102 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a media server system 104). The other device may then provide web page data and/or other data to the mobile device 102, which causes visual indicia to be displayed by the display of the mobile device 102. Accordingly, the browser window displays the retrieved first-party content, such as web pages from various websites, to facilitate user interaction with the first-party content.

In some implementations, the media module 134 of the mobile devices 102 is configured to receive a plurality of frames of media and associated metadata. The media may be received over a network interface 126 and stored in data storage 124. In some implementations, the frame of media is received as part of streaming media data. The streaming media may be received over the network interface 146. In some implementations, the media module 134 is configured to identify region in the frame, based on the received metadata. In some implementations, the media module 134 is configured to crop the frame of media based on the region. In some implementations, the cropped area is further based on one or more of frames of media preceding and/or following the frame of media.

In some implementations, the media module 134 of the mobile devices 102 is configured to receive an indication of a change in orientation from one or more sensor modules 132. In some implementations, the media module 134 is configured to dynamically adjust the cropping of playing media based on a change in orientation.

The media server system 104 can include a processor 142, data storage 144, a network interface 146, a content selection module 148, a media cropping module 150, a metadata module 152, and a media content database 154. In some implementations, the content selection module 148 of the media server system 104 is configured to select media from the media content database 154. In some implementations, the media cropping module 150 is configured to pre-process media, analyze the media for features and/or objects, and crop the media based on the analysis of the features and/or objects. In some implementations, the metadata module 152 is configured to extract data based on pre-processing media, analyzing the media for features and/or objects, and determination of a cropping path for a target aspect ratio or resolution. Although shown on media server system 104, in many implementations, media cropping module 150 may be executed on one or more mobile devices 102.

The media server system is shown to include a media cropping module 150. In some implementations, the media cropping module 150 is configured to pre-process media, analyze the media for features and/or objects, and crop the media based on the analysis of the features and/or objects. In some implementations, the media cropping module 150 is configured to determine if cropping is needed based on if one or more values of a target aspect ratio is smaller than the current values of the aspect ratio of the frames of media being analyzed. In some implementations, the media cropping module 150 is configured to only crop the frames of the media if one or more values of a target resolution is smaller than the current values of the resolution of the frame of media. In some implementations, the media cropping module 150 is configured to crop the media to match a target aspect ratio or to match a target resolution. The media cropping module 150 may be configured to add additional padding to one or more sides of the cropped frame of media to match the target aspect ratio or to match the target resolution. In some implementations, the media cropping module 150 may be configured to further base the cropped area on one or more of frames of the media preceding and/or following the current frame of media being cropped. In some implementations, the media cropping module 150 is configured to include one or more regions that exceeds a threshold. In some implementations, the media cropping module 150 is configured to at least include one or more regions of a plurality of regions with scores that exceed a threshold value are considered when the media cropping module 150 is determining the region to include when cropping the frame of media.

In some implementations, the metadata module 152 is configured to extract data based on pre-processing media, analyzing the media for features and/or objects, and determination of a cropping path for a target aspect ratio or resolution. In some implementations, the metadata module 152 is configured to receive the metadata as part of the media file containing a plurality of frames of media. In some implementations, the metadata module 152 is configured to receive the metadata independently, along with an identifier or other data associating the metadata with the received plurality of frames of media. In some implementations, the metadata module 152 is configured to analyze the metadata to determine the portion s of data related to regions associated with one or more of the frames of media associated with the media. In some implementations, the metadata module 152 is configured to extract bounding information of one or more regions for each of the plurality of frames of the media included in the metadata. In some implementations, the metadata module 152 is configured to extract locations within each of the plurality of frames of the media of one or more features. Features may include objects such as automobiles, buildings, people, animals, street signs, and the like, text, borders of the frame of media, uniform color padding of one or more sides of the frame of media, etc. In some implementations, the metadata module 152 is configured to identify a plurality of features and/or regions of one or more of the plurality of frames of the media. In some implementations, the metadata module 152 is configured to associate the received metadata with a target aspect ratio or a target resolution.

Figure 2:
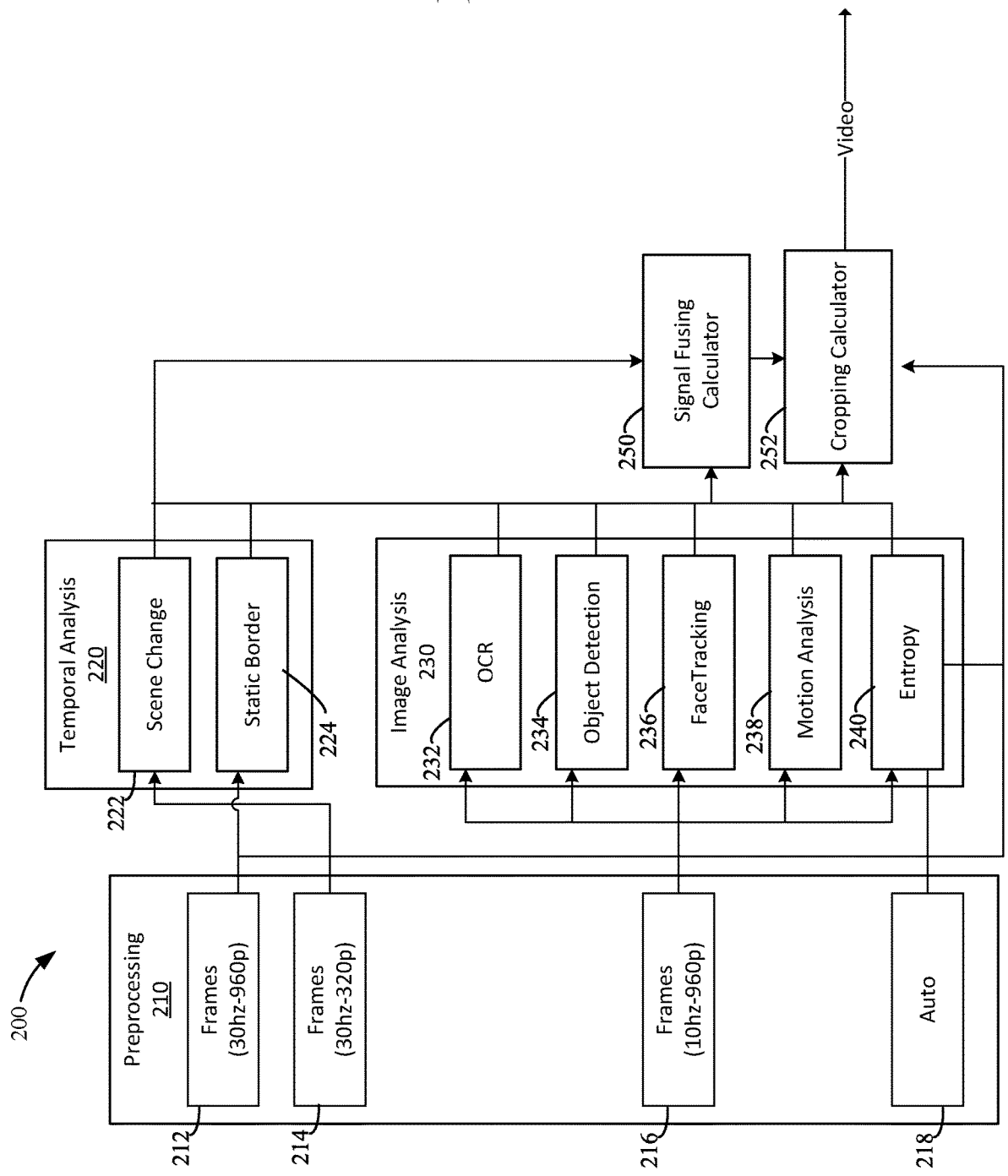
FIG. 2 is a block diagram depicting software and/or hardware modules configured for media pre-processing, media analysis, and cropping of received media.

FIG. 2 is a block diagram of software and/or hardware modules for media pre-processing, media analysis, and cropping of received media. In some implementations, the preprocessing module 210 is configured to preprocess the media and down convert the media using down convert module 212, down convert module 214, down convert module 216, down convert module 218, and the like. In some implementation, the preprocessing module 210 is configured to send the resulting output to one or more of a temporal analysis 220 module and an image analysis 230 module. The temporal analysis 220 module may comprise a scene change 222 module and a static border 224 module. The image analysis 230 module may comprise an OCR 232 module, object detection 234 module, face-tracking 236 module, motion analysis 238 module, and entropy 245 module. The temporal analysis 220 module and image analysis 230 module may be configured to send their data results to a signal fusing calculator 250 and a cropping calculator 252. Although shown separately, in many implementations, temporal analysis and image analysis modules may be part of the same analyzer system or module. Similarly, components illustrated within temporal analysis and image analysis modules may be separate from the temporal analysis or image analysis module, or may be provided by other modules.

In some implementations, a temporal analysis 220 module may comprise an application, applet, service, server, daemon, routine, or other executable logic for performing analysis on a sequence of images, such as images of a video. Temporal analysis 220 module may comprise a scene change 222 module that is configured to analyze a plurality of frames of media to determine scene changes. Scene change 222 module may comprise an application, applet, service, server, daemon, routine, or other executable logic for identifying differences between consecutive images that indicate a scene change or significant break in a video. In some implementations, the scene change 222 module is configured to determine scene changes by using key point detection to analyze when there is a large change in the key points indicating a scene break or a change in scene. In some implementations, the scene change 222 module is configured to compare all pixels in one frame to the pixels in a successive frame and if more than a certain threshold of pixels are different when considered as part of an optical flow, it is an indication of a scene change. In some implementations, the scene change 222 module is configured to calculate a motion vector between a plurality of frames of media and a lack of a coherent motion vector between successive frames indicates a scene change. Features may then be identified within a particular scene and the regions containing the particular features tracked among the plurality of frames of media within a particular scene. In some implementations, the scene change 222 module is configured to track the information of where the particular features are within the plurality of frames of media and such information is also used to determine where to crop the frame of media based on the region.

In some implementations, a temporal analysis 220 module comprises a static border 224 module that is configured to analyze a plurality of frames of media to determine whether and where there are static borders. Static border 224 module may comprise an application, applet, service, server, daemon, routine, or other executable logic for identifying static borders remaining substantially unchanged between consecutive images indicating a border on at least one edge of the frame. In some implementations, the static border 224 module is configured to receive a plurality of frames of media and configured to analyze the plurality of frames of media to look for static borders along the edges of the plurality of frames. In some implementations, the static border 224 module is configured to locate borders by selecting one or more random pixels and compare lines of pixels vertically and/or horizontally to the random pixels to determine if there are unbroken lines of pixels that are close in color to the randomly selected pixels. Such lines of pixels may extend across the entire image, in some implementations, or a part of the image (e.g. quarter of the image). In some implementations, the static border 224 module is configured to locate borders that are static from one frame to the next and contain pixels that are relatively uniform in color. In some implementations, the static border 224 module is configured to locate borders that are static from one frame to the next and contain pixels that are relatively uniform in color, but also contain some additional static information such as text embedded in the border that is of a different color. Once a border is located, whether or not it contains embedded text, it can be treated during the processing of the cropping as an image.

In some implementations, the image analysis 230 module comprises an optical character recognition, OCR 232 module that is configured to detect text embedded in image data. The image data may be one or more frames of media such as video. OCR 232 module may comprise an application, applet, service, server, daemon, routine, or other executable logic for identifying text embedded in the image data of the one or more frames of media. In some implementations, OCR 232 module may compare predetermined vectors or bitmap images corresponding to letters to a portion of an image, such as via a sliding window. In some implementations, OCR 232 module may select reference images (e.g. letters) based on previous letters (e.g. according to a text prediction system), which may improve efficiency.

In some implementations, the image analysis 230 module comprises an object detection 234 module that is configured to use a neural network trained on different objects, such as via tens, hundreds, or thousands of reference images of objects. Object detection 234 module may comprise an application, applet, service, server, daemon, routine, or other executable logic for identifying visual objects (i.e., data that when displayed creates a visual representation of an object) in one or more frames of media. The neural network may identify similar elements in images of an object and create a categorization of elements representative of an object that may then be used to identify objects in new images. The image analysis 230 module may generate bounding boxes surrounding identified objects, such that the bounding boxes may be tracked from image to image.

In some implementations, the image analysis 230 module comprises a face-tracking 236 module that is configured to receive a plurality of frames of media and analyze the plurality of frames of media to detect facial features, e.g., via eigenfaces or similar structures. Face-tracking 236 module may comprise an application, applet, service, server, daemon, routine, or other executable logic for identifying similarities between one or more consecutive frames of a media that upon display create a visual representation of one or more faces and the relative motion of the one or more faces. Face tracking may then be implemented by tracking the facial features to matching facial features in each of the plurality of frames of media.

In some implementations, the image analysis 230 module comprises a motion analysis 238 module that is configured to analyze the motion of objects detected in a plurality of frames of media and to calculate a motion vector between the plurality of frames of media. Motion analysis 238 module may comprise an application, applet, service, server, daemon, routine, or other executable logic for identifying similarities between one or more consecutive frames of a media that upon display create a visual representation of one or more objects and the relative motion of the one or more objects. In some implementations, the motion analysis 238 module as configured to calculate a global motion vector from a difference in pixels in a region of a first frame of media to the pixels of a second frame of the media.

In some implementations, the image analysis 230 module comprises an entropy 240 module that is configured to analyze the entropy of each frame in a plurality of frames of media and to calculate a difference in entropy (i.e, a measure of the amount of change or difference that has occurred from one frame to another) to determine key frames. Entropy 240 module may comprise an application, applet, service, server, daemon, routine, or other executable logic for analyzing the entropy of one or more frames of media. In some implementations, the entropy 240 module is configured to analyze entropy between identified regions of frames of media to calculate a difference in entropy to determine key regions. In some implementations, the entropy 240 module is configured to extract values from the plurality of frames of media that characterizes the randomness of motion vectors associated with regions in the frames allowing the plurality of frames of media to segmented into distinct events (e.g., scene changes in a video).

In some implementations, the signal fusing calculator 250 module is configured to merge the data from the temporal analysis 220 module and the image analysis 230 modules and determine the important objects and/or features of an entire scene comprising a plurality of frames of media. The merged data may then be used by the cropping calculator 252 module to crop the plurality of frames of media to regenerate the media. In some implementations, the media is regenerated to a video in the target aspect ratio. In some implementations, the signal fusing calculator 250 module is configured to assign weights to the different outputs of the analyzers. The signal fusing calculator 250 module may normalize the different outputs through a specified range to values that have been determined by a deep learning method.

Methods of Automatically Cropping Media

Figure 3:
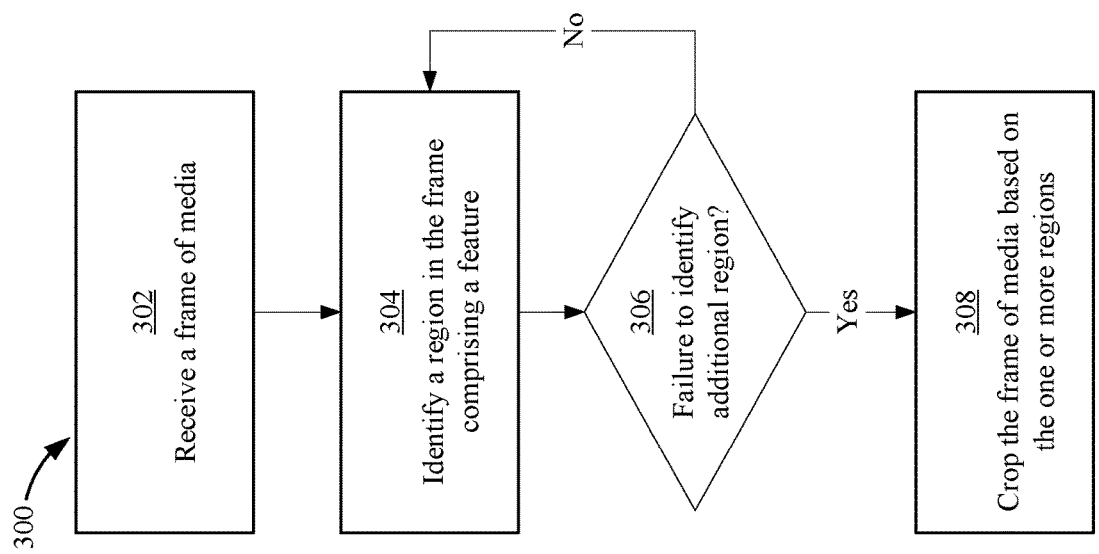
FIG. 3 is a flow diagram depicting an implementation of a method of cropping a frame of media.

FIG. 3 is a flow diagram of an implementation of a method 300 of cropping a frame of media. In some implementations, method 300 is implemented by a processor 142 of a media server system 104 executing instructions stored on data storage 144 and may use media extracted from a media content database 154. In brief, the method 300 comprises receiving a frame of media at 302 and identifying a region in the frame comprising a feature at 304. If an additional region is identified at 306, the method returns to identifying a region in the frame comprising a feature at 304. If there is a failure to identify a region at 306, the method continues cropping the frame of media based on the one or more regions identified at 308.

Still referring to FIG. 3 and in more detail, method 300 begins when a frame of media is received at 302. In some implementations, the media is a media file containing a plurality of frames of media (e.g., a video file). The media may be stored in a media content database 154 or retrieved over a network interface 146. In some implementations, the frame of media is received as part of streaming media data. The streaming media may be received over the network interface 146. In some implementations, the frame of media is part of a list of stored media and each media is taken in turn to be processed. In some implementations, a determination is first made whether the media needs to be cropped and/or processed. The determination may be done by comparing the stored dimensions, aspect ratio, resolution, etc. of the stored media with the target values.

A region in the frame comprising a feature is identified at 304. In some implementations, the feature is identified by analyzing the frame using facial recognition. In some implementations, the feature is identified by analyzing the frame for text using optical character recognition. In some implementations, the feature is identified by analyzing the frame for objects (e.g., automobiles, buildings, people, animals, street signs, and the like), using object recognition. In some implementations, the feature is identified by analyzing the frame for borders, frames, and/or padding (e.g., a border of uniform or near uniform color at one or more edges of the frame). In some implementations, the frame is analyzed to identify a plurality of features. The features may be of different types (e.g., faces, text, objects, etc.). If there is not a failure to identify an additional region at 306, the method returns to identifying an additional region in the frame comprising a feature at 304.

If there is a failure to identify an additional region at 306, the frame of media is cropped based on the one or more regions at 308. In some implementations, the frame of media is only cropped if one or more values of a target aspect ratio is smaller than the current values of the aspect ratio of the frame of media. In some implementations, the frame of media is only cropped if one or more values of a target resolution is smaller than the current values of the resolution of the frame of media. In some implementations, the frame of media is cropped to match a target aspect ratio or to match a target resolution. Additional padding may be added to one or more sides of the cropped frame of media to match the target aspect ratio or to match the target resolution. In some implementations, the cropped area is further based on one or more of frames of media preceding and/or following the frame of media.

In some implementations, some padding may be added to meet the target aspect ratio during cropping. In some implementations, if there are static borders on one or edges of the frame of media they can be moved or reformatted to form and/or be a part of the padding.

In some implementations, a plurality of frames of media are received and the plurality of frames of media are analyzed to determine scene changes. Key point detection may be used to analyze when there is a large change in the key points indicating a scene break or a change in scene. In some implementations, a comparison of all pixels in one frame is compared to the pixels in a successive frame and if more than a certain threshold of pixels are different when considered as part of an optical flow, it is an indication of a scene change. In some implementations, a motion vector is calculated between a plurality of frames of media and a lack of a coherent motion vector between successive frames indicates a scene change. Features may then be identified within a particular scene and the regions containing the particular features tracked among the plurality of frames of media within a particular scene. In implementations, the information of where the particular features are tracked within the plurality of frames of media is also used to determine where to crop the frame of media based on the region.

In some implementations, a plurality of frames of media are received and the plurality of frames of media are analyzed to identify facial features. Face tracking may then be implemented by tracking the facial features to matching facial features in each of the plurality of frames of media.

In some implementations, a plurality of frames of media are received and the plurality of frames of media are analyzed to look for static borders along the edges of the plurality of frames. In some implementations, to locate borders, random pixels are selected and lines of pixels vertically and/or horizontally are compared to the random pixels to determine if there are unbroken lines of pixels that are close in color to the randomly selected pixels. In some implementations, borders are located that are static from one frame to the next and contain pixels that are relatively uniform in color. In some implementations, borders can be located that are static from one frame to the next and contain pixel that are relatively uniform in color, but also contain some additional static information such as text embedded in the border that is of a different color. Once a border is located, whether or not it contains embedded text, it can be treated during the processing of the cropping as an image.

Figure 4:
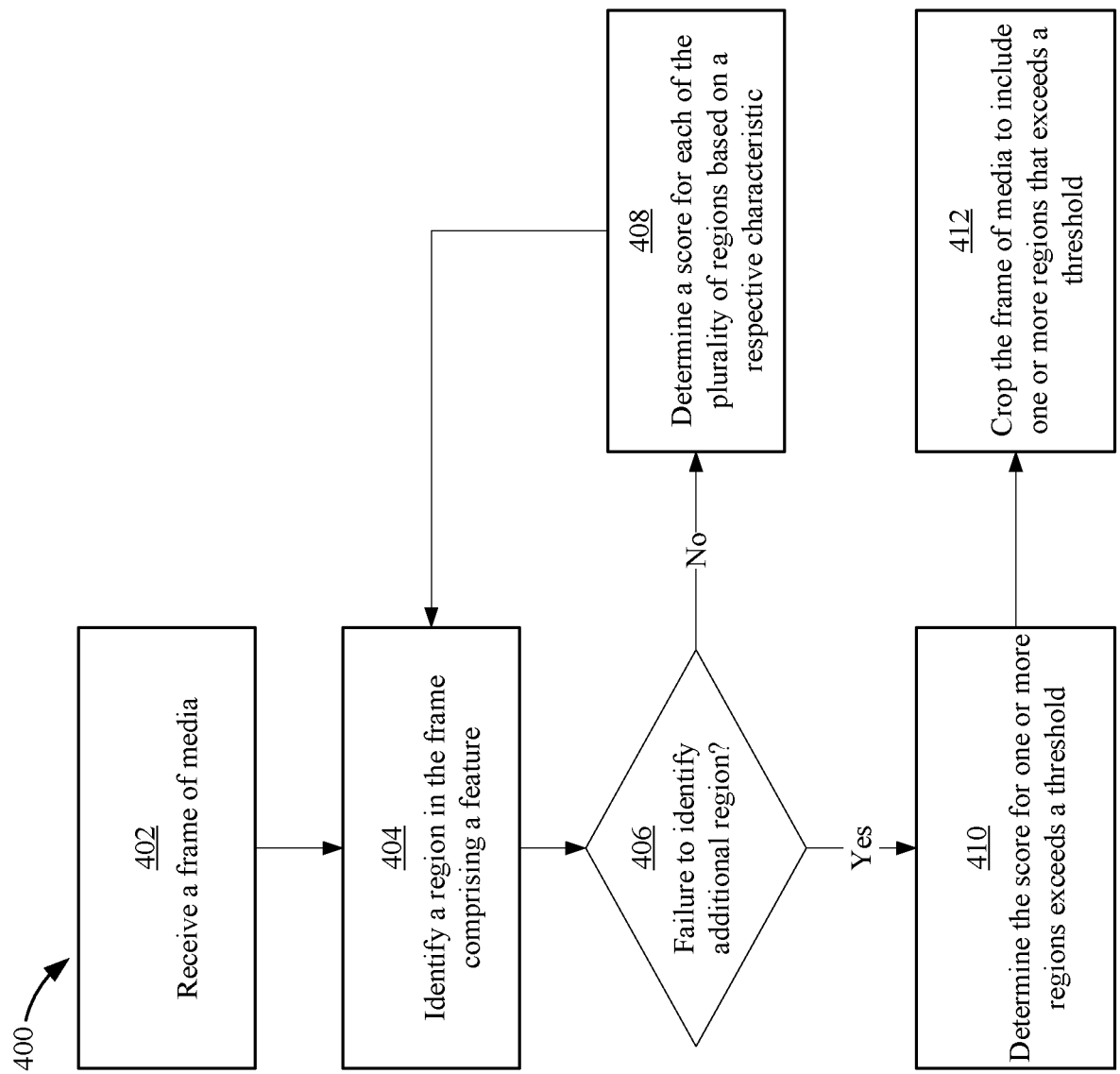
FIG. 4 is a flow diagram depicting an implementation of a method of cropping a frame of media by determining a score for each of a plurality of regions.

FIG. 4 is a flow diagram of an implementation of a method 400 of cropping a frame of media by determining a score for each of a plurality of regions. In some implementations, method 300 is implemented by a processor 142 of a media server system 104 executing instructions stored on data storage 144 and may use media extracted from a media content database 154. In brief, the method 400 comprises receiving a frame of media at 402 and identifying a region in the frame comprising a feature at 404. If an additional region is identified at 406, the method determines a score for the identified region based on a respective characteristic at 408 and returns to identifying a region in the frame comprising a feature at 404. If there is a failure to identify a region at 406, the method continues by determining the score for one or more of the identified regions exceeds a threshold at 410, and cropping the frame of media to include each region that has a score that exceeds a threshold at 412.

Still referring to FIG. 4 and in more detail, the method 400 begins when a frame of media is received at 402. In some implementations, the media is a media file containing a plurality of frames of media (e.g., a video file). The media may be stored in a media content database 154 or retrieved over a network interface 146. In some implementations, the frame of media is received as part of streaming media data. The streaming media may be received over the network interface 146.

A region in the frame, comprising a feature, is identified at 404. In some implementations, one or more of the features in the region are identified by analyzing the frame using facial recognition. In some implementations, one or more of the features in the region are identified by analyzing the frame for text using optical character recognition. In some implementations, one or more of the features in the region are identified by analyzing the frame for objects (e.g., automobiles, buildings, people, animals, street signs, and the like), using object recognition. In some implementations, one or more of the features in the region are identified by analyzing the frame for borders, frames, and/or padding (e.g., a border of uniform or near uniform color at one or more edges of the frame). In some implementations, each region is further analyzed to potentially identify a plurality of features in one or more of the regions. The features in each of the plurality of regions may be of different types (e.g., faces, text, objects, etc.). If there is not a failure to identify an additional region at 406, the method determines a score for the identified region based on a respective characteristic at 408 and returns to identifying an additional region in the frame comprising a feature at 404.

A score for the identified regions, based on a respective characteristic, is determined at 408. In some implementations, the scores are based on the type of feature that is located in the region or at least partially in the region. In some implementations, the scores are weighted based on the type of feature that is located in the region. Some characteristics the score may be based on may include size of the feature in the region, type of feature in the region, motion of feature in the region, relative motion of the feature in the region, an amount of blurriness associated with the region, an amount of blurriness associated with a feature in the region, and the like. In some implementations, the scores are assigned to the features instead of the regions containing the features. In some implementations, determining a score for each of the plurality of regions comprises determining a ranking of the plurality of regions with at least determining a top ranked region of the plurality of regions. In some implementations, determining a score for each of the plurality of regions comprises ranking each of the plurality of regions from highest to lowest, where the higher ranked regions are more likely to be included in any cropping of the frame of media.

If there is a failure to identify an additional region at 406, the method determines the score for one or more regions exceeds a threshold at 410. In some implementations, the scores for each of the plurality of regions comprise values for comparison. In some implementations, the score for a region must exceed a threshold value before the region is taken into consideration when cropping the frame of media. In some implementations, only the region with the highest score is prioritized to be included when cropping the frame of media. In some implementations, a plurality of regions is prioritized based on their respective scores to be included when cropping the frame of media. In some implementations, a determination is made for which combination of regions results in a maximized score where all regions are able to fit inside the area of the cropped frame of media.

If there is not a failure to identify an additional region at 406, the frame of media is cropped at 412 to include one or more regions with an associated score that exceeds a threshold. In some implementations, only the regions of the plurality of regions with scores that exceed a threshold value are considered when determining the region to include when cropping the frame of media. In some implementations, the frame of media is only cropped if one or more values of a target aspect ratio is smaller than the current values of the aspect ratio of the frame of media. In some implementations, the frame of media is only cropped if one or more values of a target resolution is smaller than the current values of the resolution of the frame of media. In some implementations, the frame of media is cropped to match a target aspect ratio or to match a target resolution. Additional padding may be added to one or more sides of the cropped frame of media to match the target aspect ratio or to match the target resolution. In some implementations, the cropped area is further based on one or more of frames of media preceding and/or following the frame of media.

Figure 5:
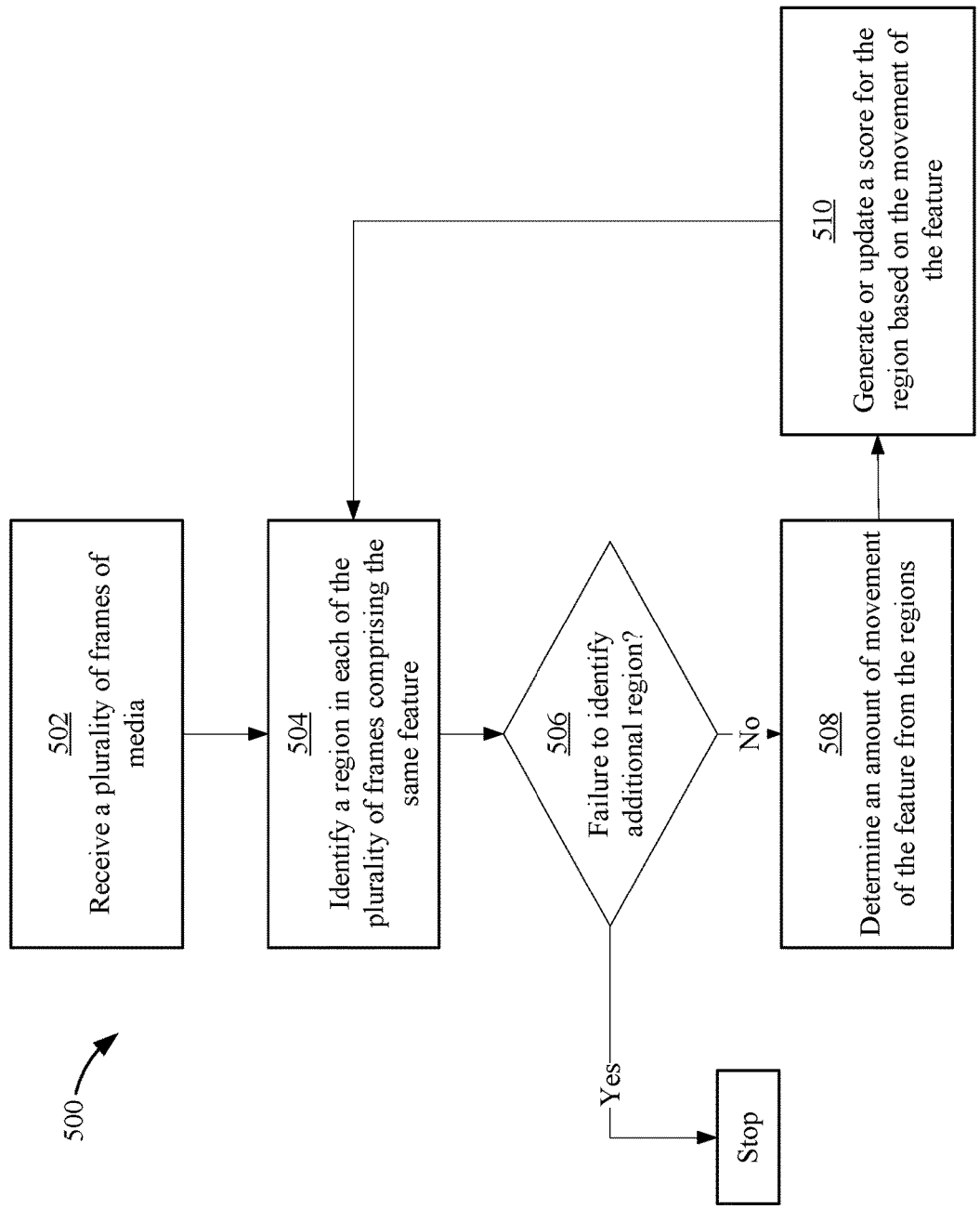
FIG. 5 is a flow diagram depicting an implementation of a method of generating or updating a score based on movement of a feature.

FIG. 5 is a flow diagram of an implementation of a method 500 of generating or updating a score based on movement of a feature. In some implementations, method 500 is implemented by a processor 142 of a media server system 104 executing instructions stored on data storage 144 and may use media extracted from a media content database 154. In brief, the method 500 comprises receiving a plurality of frames of media at 502 and identifying a region in each of the plurality of frames comprising the same feature at 504. If there is not a failure to identify additional regions at 506, the method continues by determining an amount of movement of the feature from the regions at 508, and generating or updating a score for the region based on the movement of the feature at 510 before returning to 504 to identify an additional region in each of the plurality of frames comprising the same feature. If there is a failure to identify additional regions at 506, the method stops Still referring to FIG. 5 and in more detail, the method 500 begins when a plurality of frames of media is received at 502. In some implementations, the media is a media file containing the plurality of frames of media (e.g., a video file). The media may be stored in a media content database 154 or retrieved over a network interface 146. In some implementations, the plurality of frames of media are received as part of streaming media data. The streaming media may be received over the network interface 146.

A region in each of the plurality of frames comprising the same feature is identified at 504. In some implementations, identification of the feature as the same feature comprises comparing characteristics of the feature. Characteristics of the feature may include object attributes, color values, size, and the like. In some implementations, identification of the feature as the same feature is also based on proximity of the region bounding the feature between frames of the plurality of frames preceding and following the frame.

If there is not a failure to identify additional regions at 506, an amount of movement of the feature from the regions is determined at 508. In some implementations, the amount of movement of the feature from the regions is determined by the absolute position of the feature within each of the plurality of frames. In some implementations, the amount of movement of the feature from the regions is determined by the relative position of the feature within each of the plurality of frames when compared to one or more of preceding or following frames. In some implementations, the amount of movement is determined by an increase or decrease in size of the feature between one or more of the plurality of frames. A combination of different ways of determining the amount of movement of the feature may be used to determine the amount of movement between two or more of the plurality of frames.

A score for the region, based on the movement of the feature, is generated or updated at 510. In some implementations, the scores are based on or adjusted based on the amount of movement of the feature between two or more frames of the received plurality of frames. In some implementations, the adjustment of the scores is done by weighting existing scores for regions containing one or more features of the frame based on a determined amount of movement between a plurality of frames of the one or more features. In some implementations, the scores are assigned to the features instead of the regions containing the features. In some implementations, determining a score for each of the plurality of regions comprises determining a ranking of the plurality of regions with at least determining a top ranked region of the plurality of regions. In some implementations, determining a score for each of the plurality of regions comprises ranking each of the plurality of regions from highest to lowest, where the higher ranked regions are more likely to be included in any cropping of the frame of media.

Use of Metadata

The conversion of media that includes detection of parts of the image or video (e.g., features) for each frame that are important and the intelligent cropping or padding to retain important features while discarding unimportant regions, static borders, etc. may be performed on different computing systems. In some implementations, the detection of parts of the image, video, or other media may be done on a server system and used to create metadata associating the areas or bounds containing features with the frames of the media. Based on the identified important areas, the image or video may be intelligently cropped or padded to retain important features while discarding unimportant regions, static borders, etc. on another device, such as a mobile device Features detected may include face tracking, object detection and/or recognition, text detection, detection of dominant colors, motion analysis, scene change detection, and image saliency. Detection and recognition can use methods and algorithms that are deep learning based. Text detection may use optical character recognition (OCR). Detection of features to place in the metadata allows for an optimal cropping path to be executed on the mobile device. Other aspects of the invention may include padding the image to match the background color and removing and/or reformatting any borders to fit the new display mode. Although the media primarily discussed in terms of video, in many implementations the systems may be applied to individual images or frames.

Figure 6:
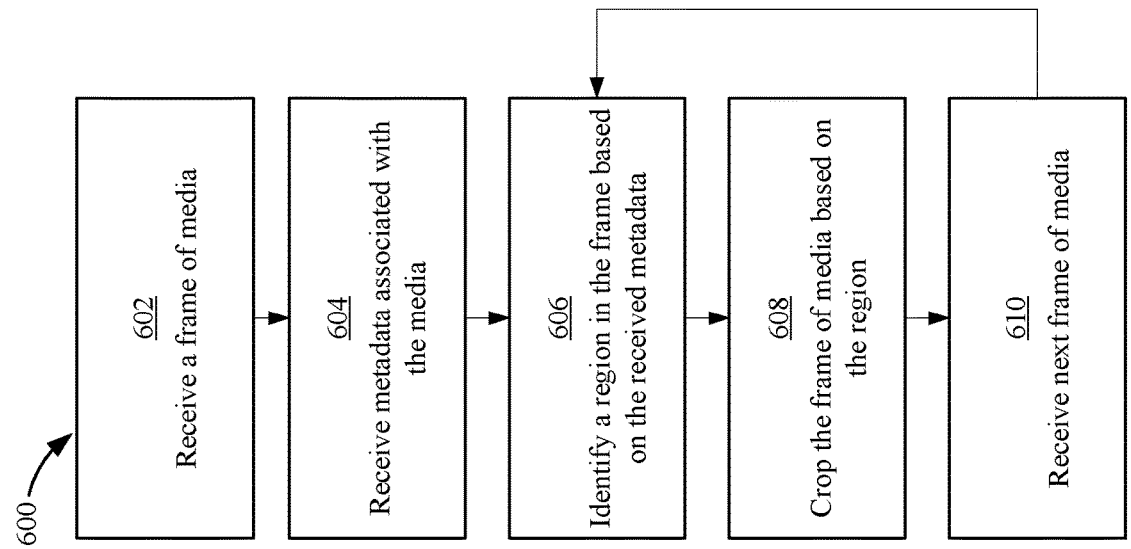
FIG. 6 is a flow diagram depicting an implementation of a method of cropping a frame of media using received metadata.

FIG. 6 is a flow diagram of an implementation of a method 600 of cropping a frame of media using received metadata. In some implementations, method 600 is implemented by a processor 122 of a mobile device 102 executing instructions stored on data storage 124. In brief, the method 600 comprises receiving a frame of media at 602, receiving metadata associated with the media at 604, identifying a region in the frame based on the received metadata at 606, cropping the frame of media based on the region at 608, and receiving the next frame of media at 610.

Still referring to FIG. 6 and in more detail, the method 600 begins when a frame of media is received at 602. In some implementations, the media is a media file containing a plurality of frames of media (e.g., a video file). The media may be received over a network interface 126 and stored in data storage 124. In some implementations, the frame of media is received as part of streaming media data. The streaming media may be received over the network interface 146.

The metadata associated with the media is received at 604. In some implementations, the metadata is received as part of the media file containing a plurality of frames of media. In some implementations, the metadata is received independently, along with an identifier or other data associating the metadata with the received plurality of frames of media. In some implementations, the metadata comprises data related to regions associated with one or more of the plurality of frames of media. In some implementations, bounding information of one or more regions for each of the plurality of frames of media is included in the metadata. In some implementations, locations within each of the plurality of frames of media of one or more features is contained in the metadata. Features may include objects such as automobiles, buildings, people, animals, street signs, and the like, text, borders of the frame of media, uniform color padding of one or more sides of the frame of media, etc. In some implementations, the metadata may identify a plurality of features and/or regions of one or more of the plurality of frames of media. In some implementations, the metadata is associated with a target aspect ratio or a target resolution. The metadata may, in some implementations, identify one or more regions of frames of the media. Each of the one or more identified regions may be regions determined to have a score that exceeds a threshold. The score may be determined by a cropping calculator as described above.

A region in the frame, based on the received metadata, is identified at 606. In some implementations, the region in the frame is retrieved from the metadata and comprises a feature identified through the use of facial recognition. In some implementations, the region in the frame is retrieved from the metadata and comprises a feature identified by analyzing the frame for text using optical character recognition. In some implementations, the region in the frame is retrieved from the metadata and comprises a feature identified by analyzing the frame for objects (e.g., automobiles, buildings, people, animals, street signs, and the like), using object recognition. In some implementations, the region in the frame is retrieved from the metadata and comprises a feature identified by analyzing the frame for borders, frames, and/or padding (e.g., a border of uniform or near uniform color at one or more edges of the frame). In some implementations, the region in the frame is retrieved from the metadata and comprises a plurality of features. The features may be of different types (e.g., faces, text, objects, etc.). In some implementations, a plurality of regions are retrieved from the metadata for the frame of media. In some implementations, a plurality of frames of media are received and the metadata is associated with the plurality of frames of media.

The frame of media is cropped at 608 based on the region. In some implementations, the frame of media is only cropped if one or more values of a target aspect ratio is smaller than the current values of the aspect ratio of the frame of media. In some implementations, the frame of media is only cropped if one or more values of a target resolution is smaller than the current values of the resolution of the frame of media. In some implementations, the frame of media is cropped to match a target aspect ratio or to match a target resolution. The target aspect ratio or target resolution may change depending on the orientation of a mobile device 102 displaying the frame of media. Additional padding may be added to one or more sides of the cropped frame of media to match the target aspect ratio or to match the target resolution. In some implementations, the cropped area is further based on one or more of frames of media preceding and/or following the frame of media.

The next frame of media is received at 610 until no more frames are available. The next frame of media may be received over a network interface 126 and stored in data storage 124. In some implementations, the next frame of media is received as part of streaming media data. The streaming media may be received over the network interface 146. As long as there are more frames available, the method may continue by again moving on to identify a region in the next frame based on the received metadata.

Figure 7:
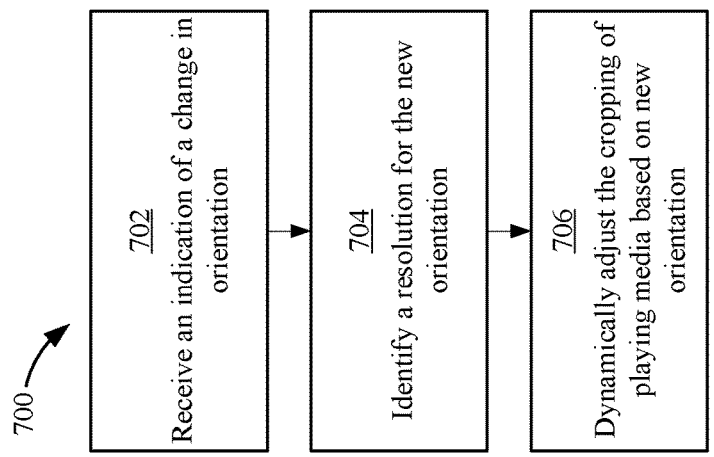
FIG. 7 is a flow diagram depicting an implementation of a method of adjusting cropping based on a change in orientation.

FIG. 7 is a flow diagram of an implementation of a method 700 of adjusting cropping based on a change in orientation. In some implementations, method 700 is implemented by a processor 122 of a mobile device 102 executing instructions stored on data storage 124 and receiving data from one or more sensor modules 132. In brief, the method 700 comprises receiving an indication of a change in orientation at 702, identifying a resolution for the new orientation at 704, and dynamically adjusting the cropping of playing media based on the new orientation at 706.

Still referring to FIG. 7 and in more detail, the method 700 begins when an indication of a change in orientation is received at 702. In some implementations, the indication of a change in orientation is received from a sensor module 132 (e.g., an accelerometer and/or magnetometer). In some implementations, the change in orientation or detection of orientation occurs prior to the display of media. In some implementations, the change in orientation occurs during the display of media, and a change to the display of media occurs in real time following the detection of the change in orientation.

A resolution and/or aspect ratio for the new orientation is identified at 704. In some implementations, the resolution and/or aspect ratio is predetermined by an application displaying the media. The resolution and/or aspect ratio may have predetermined values for both a landscape and portrait orientation. In some implementations, the resolution and/or aspect ratio depending on orientation, is determined to minimize the amount of unused display space. In some implementations, the resolution and/or aspect ratio depending on orientation, is determined to minimize the amount of padding needed to fit the displayed media in the available display space.

The cropping of playing media is dynamically adjusted at 706 based on the new orientation. In some implementations, the change in orientation occurs during the display of media, and a change to the display of media occurs in real time following the detection of the change in orientation. In some implementations, the frame of media or the plurality of frames of media remain the same, but the cropping is altered based on received metadata to fit in the new resolution and/or aspect ratio.

Figure 8:
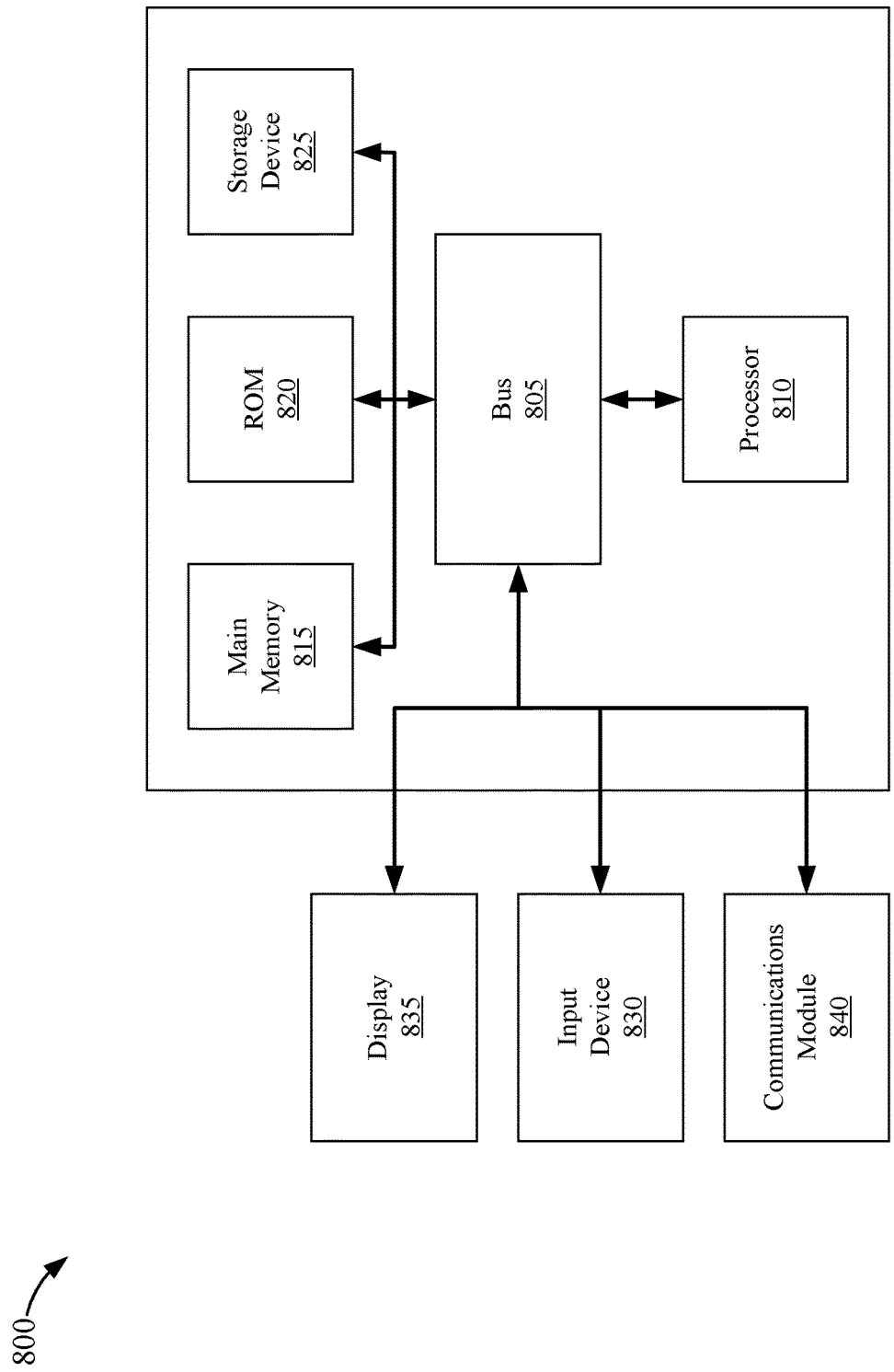
FIG. 8 is a block diagram depicting a general architecture for a computing system that may be employed to implement various elements of the systems and methods described and illustrated herein.

FIG. 8 is a block diagram of a general architecture for a computing system 800 that can be used to implement the mobile devices 102, media server systems 104, etc. The computing system 800 includes a bus 805 or other communication component for communicating information and a processor 810 coupled to the bus 805 for processing information. The computing system 800 can also include one or more processors 810 coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing system 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes and/or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes and/or method steps described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including in some implementations a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, in some implementations, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including in some implementations semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; in some implementations, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method, comprising:
   receiving, by a mobile device, data of a first frame of a video;
   extracting, by a video preprocessor of the mobile device from the data of the first frame, an identification of a first region of the first frame of the video;
   cropping, by the video preprocessor of the mobile device, the first frame of the video to a cropped size centered on the identified first region of the first frame of the video, the cropped size based on an aspect ratio of the mobile device, a resolution of a display of the mobile device, and a first display orientation to display the first frame of the video, the first display orientation is one of a portrait orientation or a landscape orientation;
   displaying, on the display of the mobile device, the cropped first frame of the video in the first display orientation;
   receiving, by the mobile device, data of a second frame of the video;
   extracting, by the video preprocessor of the mobile device from the data of the second frame, region data associated with a second region of the second frame of the video;
   cropping, by the video preprocessor of the mobile device, the second frame of the video to the cropped size centered on the identified first region of the first frame and further based on the aspect ratio of the mobile device, the resolution of the display of the mobile device, and a second display orientation to display the second frame of the video, the second display orientation is different from the first display orientation and is another of the portrait orientation or the landscape orientation; and
   displaying, on the display of the mobile device, the cropped second frame of the video in the second display orientation.

2. The method of claim 1, further comprising:
   receiving an indication of a change in orientation from the first display orientation to the second display orientation.

3. The method of claim 1, wherein cropping the first frame of the video further comprises:
   calculating frame boundaries to apply to the first frame of the video based on the aspect ratio of the mobile device, the resolution of the display of the mobile device, and the first display orientation; and
   identifying cropping coordinates for a rectangle centered on the identified first region of the first frame of the video based on the calculated frame boundaries.

4. The method of claim 3, wherein cropping the first frame of video further comprises identifying the cropping coordinates for the rectangle bounding all of the first region.

5. The method of claim 1, wherein the region data is associated with a plurality of regions of the first frame of the video, and cropping the first frame of the video further comprises:
   calculating frame boundaries to apply to the first frame of the video based on the aspect ratio of the mobile device, the resolution of the display of the mobile device, and the first display orientation; and
   identifying cropping coordinates for a rectangle centered on one of the plurality of regions of the first frame of the video based on the calculated frame boundaries.

6. The method of claim 5, further comprising:
   determining the cropping coordinates for the rectangle are insufficient to bound all of the plurality of regions; and
   wherein identifying the cropping coordinates for the rectangle centered on one of the plurality of regions comprises including a text image within the cropping coordinates for the rectangle.

7. The method of claim 1, wherein the data comprises one or more regions of the first frame of the video with associated scores.

8. The method of claim 7, wherein each score of the associated scores is associated with at least one feature of the respective region.

9. The method of claim 8, wherein each score of the associated scores is a score generated based upon one or more characteristics of the at least one feature.

10. A system comprising:
    one or more processors of a mobile device;
    a network interface electrically connected to the one or more processors; and
    a computer storage device electrically connected to the one or more processors and storing instructions that, when executed by the one or more processors, cause the one or more processors to:
    receive data of a first frame of a video;
    extract, from the data of the first frame, an identification of a first region of the first frame of the video;
    crop the first frame of the video to a cropped size centered on the identified first region of the first frame of the video, the cropped size based on an aspect ratio of the mobile device, a resolution of a display of the mobile device, and a first display orientation to display the first frame of the video, the first display orientation is one of a portrait orientation or a landscape orientation;
    display, on the display, the cropped first frame of the video in the first display orientation;
    receive data of a second frame of the video;
    extract, from the data of the second frame, region data associated with a second region of the second frame of the video;
    crop the second frame of the video to the cropped size centered on the identified first region of the first frame and further based on the aspect ratio of the mobile device, the resolution of the display of the mobile device, and a second display orientation to display the second frame of the video, the second display orientation is different from the first display orientation and is another of the portrait orientation or the landscape orientation; and display, on the display, the cropped second frame of the video in the second display orientation.

11. The system of claim 10, wherein the one or more processors are further configured to receive an indication of a change in orientation from the first display orientation to the second display orientation.

12. The system of claim 10, wherein to crop the first frame of the video, the one or more processors are further configured to:

calculate frame boundaries to apply to the first frame of the video based on the aspect ratio of the mobile device, the resolution of the display of the mobile device, and the first display orientation; and identify cropping coordinates for a rectangle centered on the identified first region of the first frame of the video based on the calculated frame boundaries.

13. The system of claim 12, wherein to crop the first frame of video, the one or more processors are further configured to identify the cropping coordinates for the rectangle bounding all of the first region.

14. The system of claim 10, wherein the region data is associated with a plurality of regions of the first frame of the video, and to crop the first frame of the video, the one or more processors is further configured to:

calculate frame boundaries to apply to the first frame of the video based on the aspect ratio of the mobile device, the resolution of the display of the mobile device, and the first display orientation; and identify cropping coordinates for a rectangle centered on one of the plurality of regions of the first frame of the video based on the calculated frame boundaries.

15. The system of claim 14, wherein the one or more processors is further configured to:

determine the cropping coordinates for the rectangle are insufficient to bound all of the plurality of regions; and wherein to identify the cropping coordinates for the rectangle centered on one of the plurality of regions, the one or more processors are further configured to include a text image within the cropping coordinates for the rectangle.

16. The system of claim 10, wherein the data comprises one or more regions of the first frame of the video with associated scores.

17. The system of claim 16, wherein each score of the associated scores is associated with at least one feature of the respective region.

18. The system of claim 17, wherein each score of the associated scores is a score generated based upon one or more characteristics of the at least one feature.

* * * * *